(12) United States Patent
Valles et al.

(10) Patent No.: US 11,642,847 B2
(45) Date of Patent: *May 9, 2023

(54) 3D BUILD PLATFORM REFILL OPENING AND CAP

(71) Applicant: Hewlett-Packard Development Company, L.P., Spring, TX (US)

(72) Inventors: Marius Valles, Sant Cugat del Valles (ES); Pau Martin Vidal, Sant Cugat del Valles (ES); Rafel Texido, Sant Cugat del Valles (ES); Joan Mach, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/680,661

(22) Filed: Feb. 25, 2022

(65) Prior Publication Data

US 2022/0176629 A1 Jun. 9, 2022

Related U.S. Application Data

(63) Continuation of application No. 16/084,141, filed as application No. PCT/US2016/032133 on May 12, 2016, now Pat. No. 11,285,668.

(51) Int. Cl.
*B29C 64/245* (2017.01)
*B33Y 30/00* (2015.01)
*B33Y 40/00* (2020.01)
*B29C 64/321* (2017.01)

(52) U.S. Cl.
CPC .......... *B29C 64/245* (2017.08); *B29C 64/321* (2017.08); *B33Y 30/00* (2014.12); *B33Y 40/00* (2014.12)

(58) Field of Classification Search
CPC ................ B29C 64/245; B29C 64/321; B29C 64/255; B33Y 30/00; B33Y 40/00
See application file for complete search history.

(56) References Cited

U.S. PATENT DOCUMENTS

| 6,046,426 | A | 4/2000 | Jeantette et al. |
| 7,398,664 | B1 | 7/2008 | Weinerman et al. |
| 7,686,995 | B2 | 3/2010 | Davidson et al. |
| 10,889,059 | B2 | 1/2021 | Juan et al. |
| 2004/0084814 | A1 | 5/2004 | Boyd et al. |
| 2011/0059247 | A1 | 3/2011 | Kuzusako et al. |
| 2011/0089610 | A1 | 4/2011 | El-Siblani et al. |
| 2015/0258744 | A1 | 9/2015 | Muller et al. |
| 2016/0107232 | A1 | 4/2016 | Okazaki et al. |

FOREIGN PATENT DOCUMENTS

| CN | 105188993 A | 12/2015 |
| DE | 102004057865 A1 | 6/2006 |
| EP | 1769900 A1 | 4/2007 |

(Continued)

*Primary Examiner* — Mary Lynn F Theisen
(74) *Attorney, Agent, or Firm* — Shook, Hardy & Bacon L.L.P.

(57) ABSTRACT

In example implementations, an apparatus includes a build platform and a cap. The build platform has an opening on a top surface to fill a build material storage unit. The cap is inserted into the opening to seal the opening. A top surface of the cap and the top surface of the build platform have a uniform thermal conductivity when the cap is inserted into the opening.

20 Claims, 6 Drawing Sheets

(56) References Cited

FOREIGN PATENT DOCUMENTS

| | | |
|---|---|---|
| EP | 2024168 A2 | 2/2009 |
| EP | 2450177 A1 | 5/2012 |
| JP | 2010265530 A | 11/2010 |
| KR | 10-2009-0014395 | 2/2009 |
| WO | 1995034468 A1 | 12/1995 |

3D BUILD PLATFORM REFILL OPENING AND CAP

CROSS-REFERENCE TO RELATED APPLICATIONS

This application is a continuation of U.S. patent application Ser. No. 16/084,141, filed on Sep. 11, 2018, which is a 371(c) National Phase Application of International Application No. PCT/2016/032133, filed May 12, 2016, both of which are herein incorporated by reference in their entireties.

BACKGROUND

Three dimensional (3D) printers, also referred to as additive manufacturing machines, commonly operate by using a material to generate a 3D object layer-by-layer. In some 3D printing systems, powder is delivered to a build platform from a powder storage unit. A layer of the powder is leveled and excess powder can be recycled. Portions of the layer of powder can be printed and fused using an energy source. The 3D printing system can operate at high temperatures to melt and fuse the portions of powder that are printed when building a part.

DETAILED DESCRIPTION

The present disclosure discloses examples of a build platform on a build unit that includes an opening in a top surface of the build platform and a cap. The build unit has an opening in a top surface of a build platform of the build unit. The opening may provide access to an enclosed build material storage unit within the build unit and below the build platform. As a result, the build material storage unit may be refilled with build material via a gravity fill as quickly as possible. Any clouds of dust are contained within the build material storage unit and do not form in the print zone over the build platform.

The opening in the top surface of the build platform provides easy access to the powder storage unit. For example, the opening allows an operator to easily view a powder level remaining in the powder storage unit. In addition, the powder may be periodically changed or the powder storage unit may be periodically cleaned. As a result, the opening allows for easy access to the powder storage unit.

In addition, when the opening is plugged with a cap, the top surface and the cap may be designed to have uniform thermal conductivity to ensure that the entire top surface has an even temperature profile. For example, integrity of the part being printed can be compromised if a cool spot forms over the cap, or there are large temperature differences between the cap and the top surface of the build platform.

Figure 1:
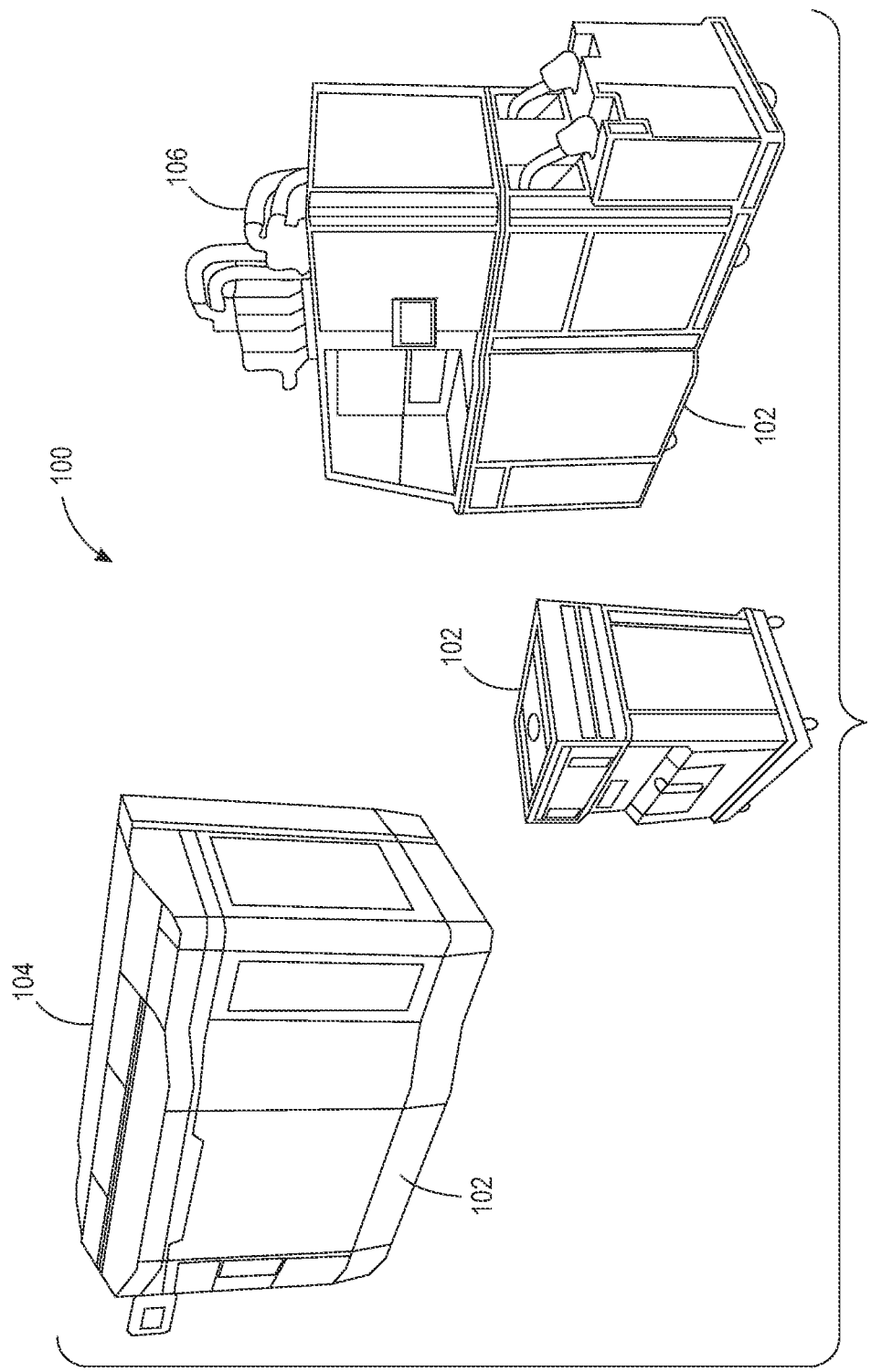
FIG. 1 is a block diagram of a side view of an example of a 3D printing system of the present disclosure.

FIG. 1 illustrates an example of a 3D printing system 100. The 3D printing system may include a build unit 102, a printer or 3D printer 104 and a build material supply/post-processing component 106. In one implementation, the build unit 102 may store a build material that is used to build a part using additive printing/processing layer by layer. The build material may be a powder (e.g., a metallic powder, a ceramic powder, and the like). In addition, the build unit 102 may provide a vertically movable build platform upon which the part is built. The build material may be delivered up from the sides of the build unit 102 onto the build platform. The build platform may move lower after each layer is printed.

In one example, the build unit 102 may be connected to the build material supply/post-processing component 106 to receive the build material. For example, FIG. 1 shows the build material supply/post-processing component 106 with the build unit 102 connected.

After the build unit 102 receives the build material, the build unit 102 may be disconnected from the build material supply/post-processing component 106 and connected to the printer 104. FIG. 1 shows the printer 104 with the build unit 102 connected.

In some implementations, the printer 104 may have a first print head for applying a fusing agent to areas of the build material that will be fused to print a layer of the part that is being printed. The first print head may also apply a detailing agent on some areas of the build material to help prevent the build material from fusing in the areas that will not be fused. Then the printer 104 may have a second print head that applies energy to fuse the areas of the build material with the fusing agent. The build platform of the build unit 102 may be lowered and a new layer of build material may be added on top of the layer of build material that was printed. The process may be repeated until the part is completed.

The build unit 102 may be removed from the printer 104 after printing of the part has completed. The build unit 102 can then be connected to the build material supply/post-processing component 106 again to extract the part. In addition, the build material supply/post-processing component 106 may also recover and recycle the unfused build material.

Although the build unit 102 is shown as being a separate component from the printer 104, it should be noted that the build unit 102 may be part of the printer 104. For example, the build material may be supplied in the printer 104 and the build platform may be part of the printer 104 rather than being deployed as part of a removable build unit such as the build unit 102.

Figure 2:
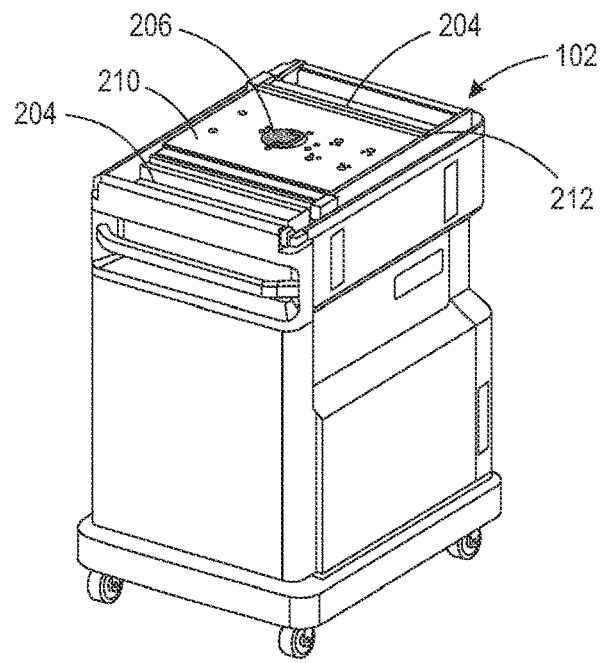
FIG. 2 is a block diagram of an example build unit of the 3D printing system.

FIG. 2 illustrates an example block diagram of the build unit 102 that includes an opening 206 on a top surface 212 of a build platform 210. In one example, feed trays 204 may be located on each side of the build platform 210.

In one implementation, the build platform 210 may be vertically movable within the build unit 102. For example, as build material is placed on the build platform 210, printed and fused, the build platform 210 may be lowered to receive another layer of build material. Then the process may be repeated until the 3D part is completely printed.

In some implementations, the opening 206 may be easily accessible by a user or a technician. In other words, a user does not need to climb a ladder or a contraption above the build unit 102 to access the opening 206. In one example, the opening 206 may be located at a height of less than six feet high. For example, the opening 206 may be located at a counter height of approximately four feet to five feet high.

Figure 3:
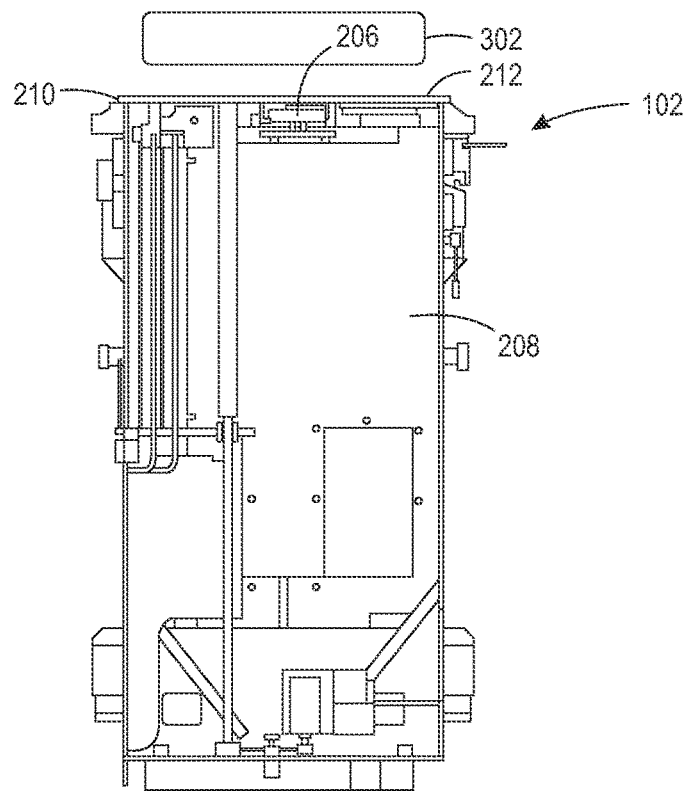
FIG. 3 is a cross-sectional diagram of an example build unit.

FIG. 3 illustrates a cross-sectional diagram of the build unit 102. A build material storage unit 208 may be located below the opening 206 and the top surface 212 of the build platform. The build material storage unit 208 may be enclosed and store a build material used to print a part via the additive process of the 3D printing system 100.

In one implementation, the build material may be fed up the sides of the build material storage unit 208 via an auger that dispenses the build material through the feed trays 204. The build material may be dispensed into a print zone 302.

As discussed above, the build material storage unit 208 may be enclosed and located below the build platform 210. As a result, the build material storage unit 208 may be quickly filled with build material via a gravity fill system. In addition, no hazardous dust clouds of build material may form in the print zone 302 from quickly pouring the build material into the build material storage unit 208.

In one embodiment, the opening 206 may also provide easy access to the build material storage unit 208. For example, an operator may quickly view the build material level by looking into the opening 206. In addition, the opening 206 may provide easy access to change the build material or clean the inside of the build material storage unit 208.

In one example, the opening 206 may be a circular shape and located in a center of the top surface 212 of the build platform 210. However, it should be noted that the opening 206 may be any shape and located anywhere on the top surface 212 of the build platform 210.

Figure 4:
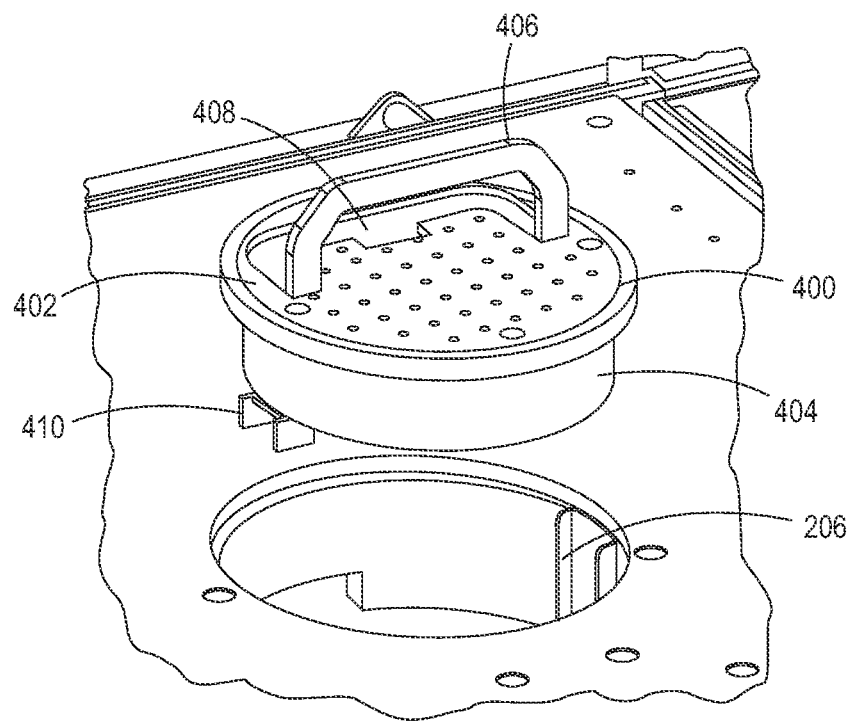
FIG. 4 is isometric view of an example of a cap.

FIG. 4 illustrates an isometric view of an example of a cap 400 that may be inserted into the opening 206 to plug or seal the opening 206. In one example, the cap 400 may include a top portion 402, a body portion 404 and a handle 406. The top portion 402 may be coupled to the body portion 404 (or molded as a single integral piece) and may have a shape that corresponds to the opening 206. For example, if the opening 206 is circular, the top portion 402 and the body portion 404 may also have a corresponding circular shape of similar dimensions (e.g., length, width, diameter, and the like) as the opening 206.

In one implementation, the top portion 402 and the body portion 404 may be fabricated from a conductive material that has a conductivity similar to the top surface 212 of the build platform 210. In other words, the cap 400 may be a conductive cap. In one example, the top portion 402 and the body portion 404 may be fabricated from a same metal as the top surface 212 of the build platform 210. In other words, if the top surface 212 of the build platform 210 is made from aluminum, a metal alloy, and the like, then the top portion 402 and the body portion 404 may be fabricated from the same aluminum, metal alloy, and the like. As a result, the entire top surface 212, including a top surface of the top portion 402 of cap 400, may have the same thermal conductivity and no differences in temperature gradients may be formed on the top surface 212 of the build platform 210. In other words, the top portion 402 of the cap 400 and the top surface 212 of the build platform 210 may have a uniform thermal conductivity.

In one implementation, the body portion 404 may include a mating mechanism 410 to mate with a corresponding mechanism in the opening 206. For example, the mating mechanism 410 may be a mechanical connection such as a twist and lock mechanism, or threads to allow the cap 400 to be screwed in, a lock with springs and ball plungers, magnets, and the like.

In some implementations, the mating mechanism 410 may be oriented such that the handle 406 is positioned to fall in a direction of movement of a spreader of the printer 104 when the cap 400 is inserted into the opening 206. In other words, the mating mechanism 410 may ensure that the handle 406 is in a position such that as a build material spreader moves over the build platform 210, the spreader may knock down the handle 406 without interfering with the movement of the spreader.

In one example, the handle 406 may be coupled to the top portion 402. The top portion 402 may also include a cavity 408. The cavity 408 may have a similar shape (e.g., the shape of the outer perimeter and thickness) as the handle 406. The handle 406 may rest in the cavity 408 such that the top surface 212, the top portion 402 and the handle 406 are all co-planar during operation of the printer 104. In other words, the top surface 212, the top portion 402 and the handle 406 lie on a single plane or the same plane. Said another way, the top surface of the handle 406 when resting in the cavity 408 is not lower than the top surface of the top portion 402 of the cap 400. As a result, the top portion 402 and the handle 406 may not interfere with operation of the rollers and printer carriage of the printer 104. In addition, the top portion 402 and the handle 406 may not cause changes in elevation in the layers of build material that are spread across the top of the build platform.

Figure 5:
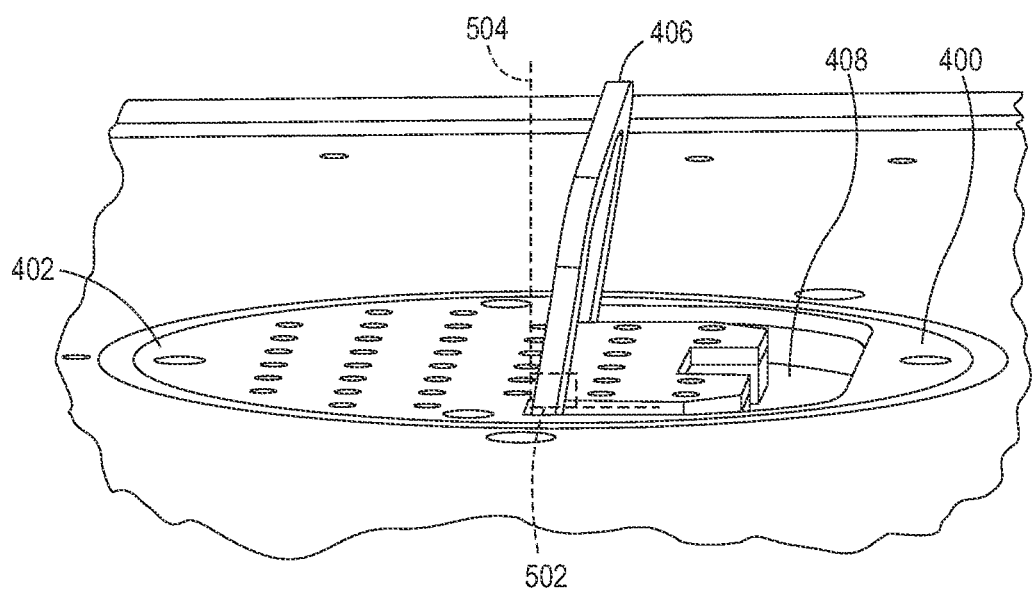
FIG. 5 is a side view of an example handle on the cap.

FIG. 5 illustrates a side view of an example of the handle 406. In one implementation, the handle 406 may be designed to have a range of motion of less than 90 degrees relative to the top surface 212 of the build platform to 0 degrees when resting in the cavity 408.

For example, FIG. 5 illustrates an angle 502 measured between a dashed line 504 and the top surface 212. The dashed line 504 is illustrated as being at an angle of 90 degrees relative to the top surface 212. The handle 406 may be designed to have a range of motion that does not reach the dashed line 504 to a resting position flush in the cavity 408.

The design of the range of motion of the handle 406 ensures that the handle 406 will fall via gravity. The range of motion of the handle 406, the design of the mating mechanism 410 that ensures that the handle 406 falls in a direction of movement of the spreader into the cavity 408, and the cap 400 may be designed to ensure no component interferes with the movement of the spreader or other mechanical portions of the printer 102 during processing of the build material.

Figure 6:
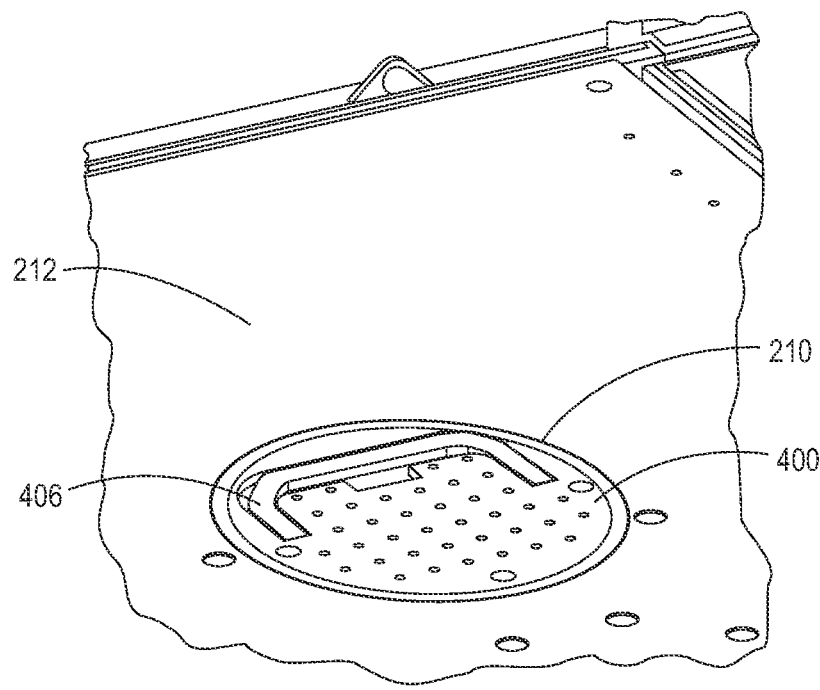
FIG. 6 is an isometric view of an example of the cap in an opening in a top surface of a build platform.

For example, FIG. 6 illustrates an example of the cap 400 that is inserted into the opening 206 in the top surface 212 of the build platform 210. The handle 406 may reset in the cavity 408 such that the top portion 402 of the cap 400 is flush, co-planar, or on the same plane, with the top surface 212 of the build platform 210. In other words, when build material is laid on top of the build platform 210 and flattened by the spreader, no changes of elevation would exist in the build material.

Figure 7:
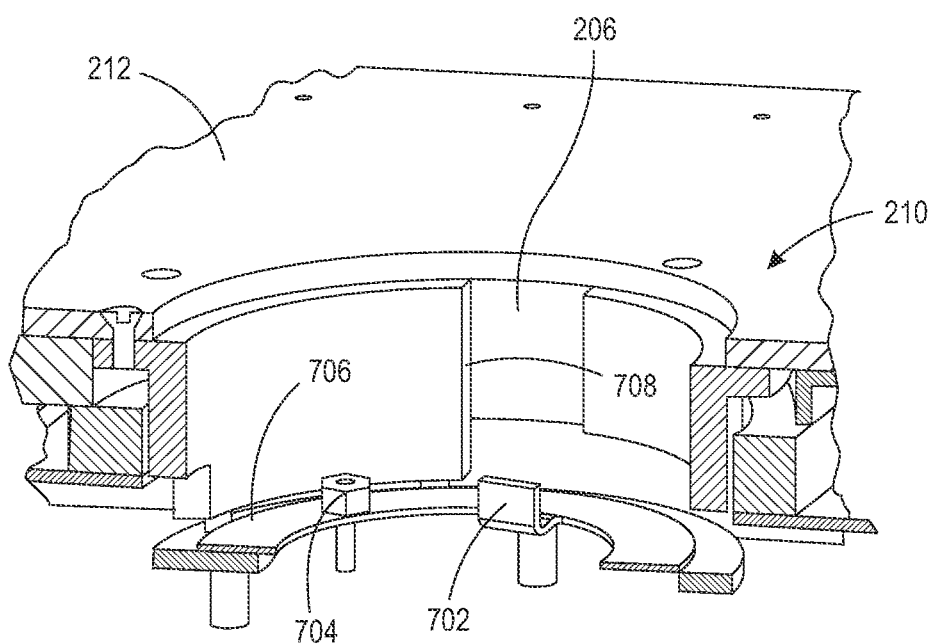
FIG. 7 is a cross-sectional diagram of an example of the opening in the top surface of the build platform.

FIG. 7 illustrates a cross-sectional diagram of an example of the opening 206 in the top surface 212 of the build platform 210. In one embodiment, the opening 206 may include a corresponding mating mechanism 708. For example, the mating mechanism 410 of the cap 400 may align and mate with the corresponding mating mechanism 708 of the opening 206. As described above, in some implementations, the corresponding mating mechanism 708 may be aligned such that when the cap 400 is inserted into the opening, the handle 406 will fall in a direction of movement of the spreader.

Figure 8:
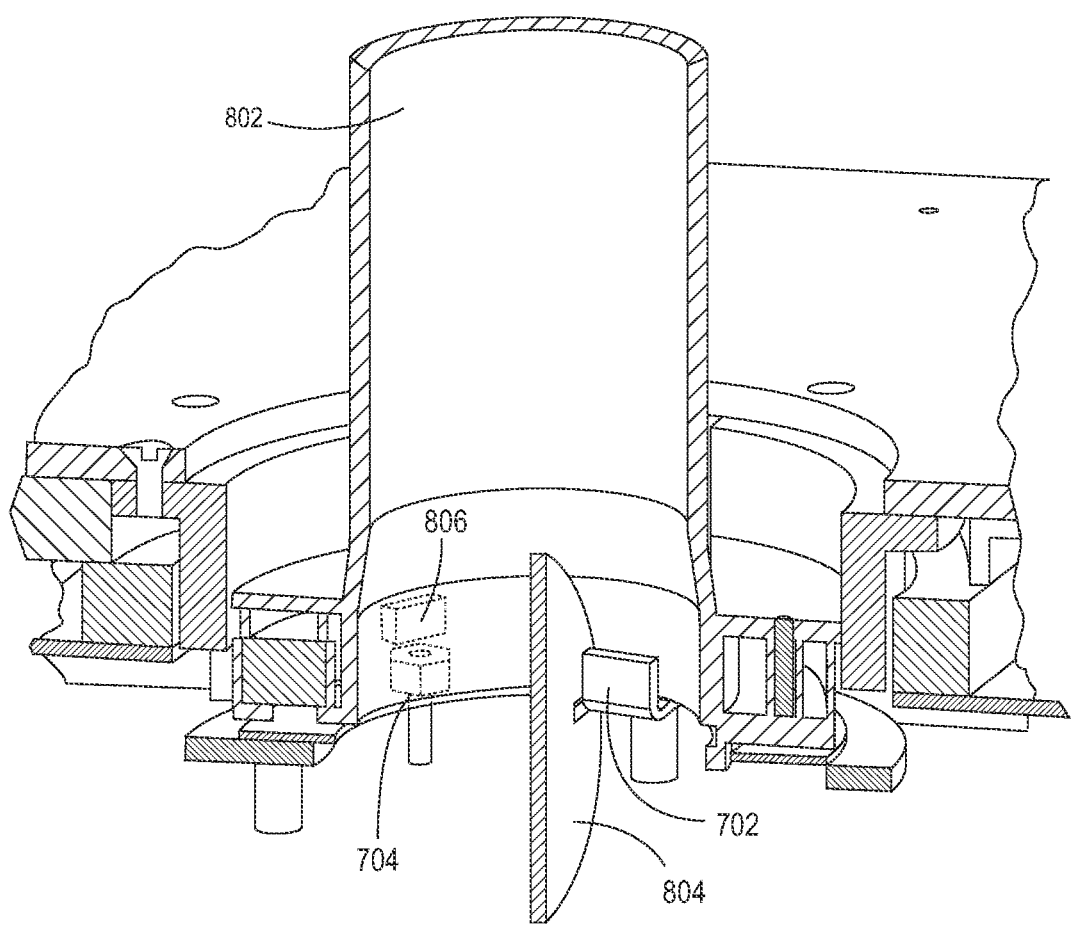
FIG. 8 is a cross-sectional diagram of an example of a supply hose connected to the opening.

In one example, the opening may include a bottom ring 706. The surface of the bottom ring 706 may include a hose valve opening mechanism 702 and a magnet 704. FIG. 8 illustrates an example of a supply hose 802 that is inserted into the opening 206 to fill the build material storage unit 208 with build material. The hose 802 may include a valve 804 to prevent loose build material from spilling out of the hose 802. The hose 802 may also include a sensor 806 to detect the magnet 704.

In one example, the sensor 806 may detect the magnet 704 indicating that the hose 802 has been inserted into the opening 206 properly. In one example, the hose valve opening mechanism 702 may comprise a hook that protrudes perpendicular to a surface of the bottom ring 706. The hook may turn and lock the valve 804 into an open position. As a result, when the hose 802 is properly inserted into the opening 206 (e.g., as indicated by the sensor 806 detecting the magnet 704) the valve 804 may be opened and ready for filling the build material storage unit 208.

Figure 9:
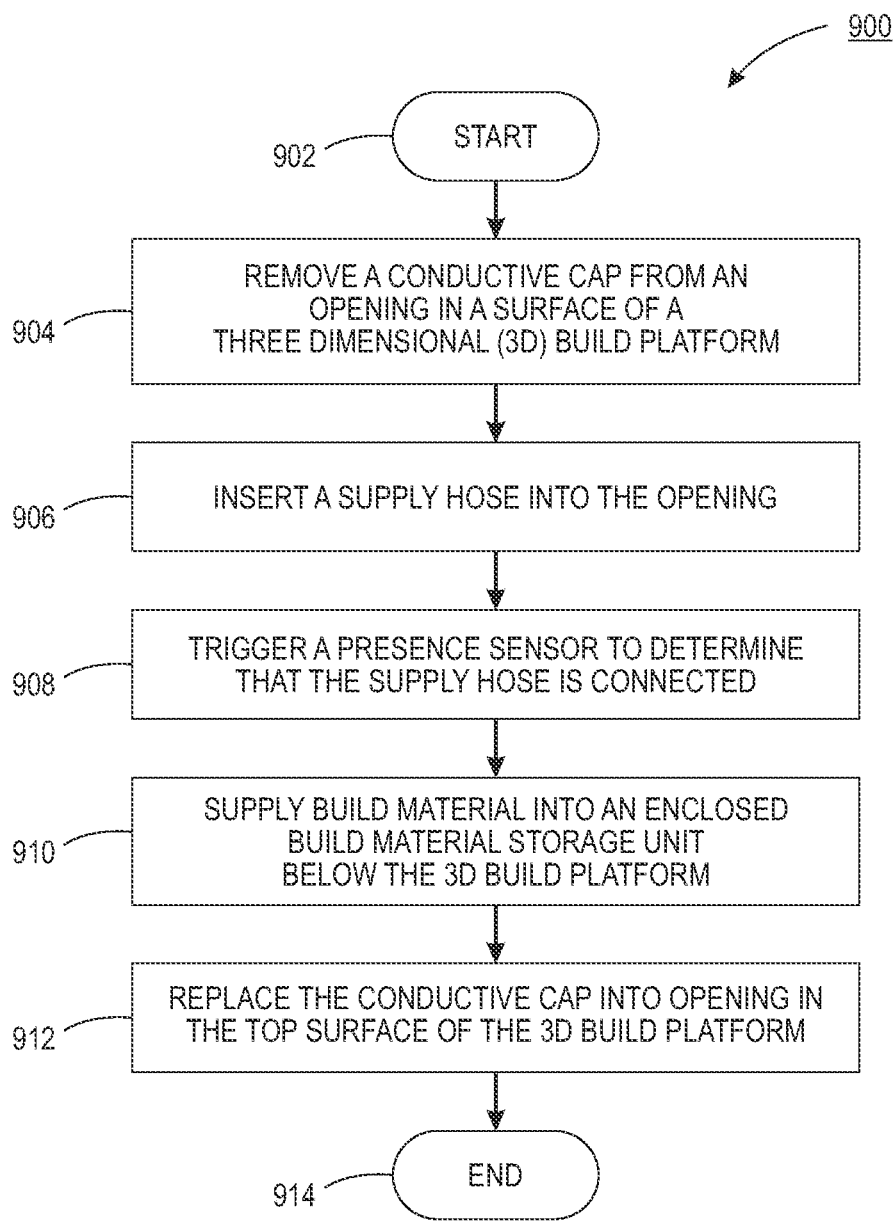
FIG. 9 is a flow diagram of an example method for supplying build material through an opening in a top surface of a build platform.

FIG. 9 illustrates a flow diagram of an example method 900 for supplying build material through an opening in a top surface of a build platform. In one example, the blocks of the method 900 may be performed the build unit 102 or the 3D print system 100.

At block 902, the method 900 begins. At block 904, the method 900 provides for a conductive cap to be removed from an opening in a top surface of a 3D build platform. For example, the conductive cap may be removed to allow for access to the opening. The 3D build platform may be located on top of a movable build unit. The build unit may be moved into a build material supply/post-processing component of a 3D printing system after the conductive cap is removed.

In one example, the conductive cap may be removed with a handle that is coupled to a top surface of the conductive cap. The handle may rest in a cavity in the top surface of the conductive cap and be designed to automatically fall into the cavity even if the handle is accidently left up.

At block 906, the method 900 provides for a supply hose to be inserted into the opening. In one example, the supply hose may be part of the build material supply/post-processing component of a 3D printing system. The supply hose may be used to fill the build material storage unit in the build unit with build material that is used to print a 3D part.

At block 908, a presence sensor is triggered to determine that the supply hose is connected. In one example, the build unit may not contain any sensors due to the high operating temperatures used in 3D printing. Rather, the sensors may be contained in the supply hose. The opening in the build unit may contain a magnet that is detected by the presence sensor on the supply hose to indicate that the supply hose has been properly inserted into the opening.

In addition, the opening may contain a hose valve opening mechanism that opens a valve at an end of the supply hose. For example, an end of the supply hose may have a valve to prevent loose or excess build material from spilling out of the supply hose. The hose valve opening mechanism may cause the mechanical valve on the end of the supply hose to open and remain open.

At block 910, build material is supplied into an enclosed build material storage unit below the 3D build platform. In one example, the build material may be supplied via a gravity fill. In other words, the build material may be poured from a source that is located above the opening in the build unit.

In addition, the build material may be poured at a maximum speed or without any pouring speed control. Since the build material storage unit is enclosed below the top surface of the build platform, any clouds of build material will remain inside the build material storage unit. The build material may be supplied into the build material storage unit as quickly as possible without fear of forming potentially dangerous clouds of build material.

At block 912, the conductive cap is replaced into the opening in the top surface of the 3D build platform. For example, the supply hose may be disconnected and the build unit may be removed from the build material supply/post-processing component. The conductive cap may be placed into the opening and the build unit may be moved to the printer to build the 3D part. For example, the handle may be used to align a mating mechanism on the conductive cap with a corresponding mating mechanism in the opening. After the conductive cap is inserted, the handle may be lowered into the cavity in the top surface of the conductive cap. When the handle is lowered, the handle, the top surface of the conductive cap and the top surface of the build platform of the build unit may be co-planar. At block 914, the method 900 ends.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An apparatus, comprising:
 a build platform having a build material storage unit;
 an opening formed on a top surface of the build platform and over the build material storage unit, wherein the opening is to receive a hose to fill the build material storage unit; and
 a cap to seal the opening, when the cap is inserted into the opening.

2. The apparatus of claim 1, wherein the cap comprises:
 a top portion;
 a body portion coupled to the top portion, wherein the body portion comprises a mating mechanism to mate with the opening in the top surface of the build platform; and
 a handle coupled to the top portion, wherein the handle rests in a cavity in the top portion.

3. The apparatus of claim 2, wherein the top portion and the handle are co-planar with the top surface of the build platform when the handle rests in the cavity in the top portion.

4. The apparatus of claim 2, wherein the mating mechanism comprises at least one of: a twist and lock mechanism or threads.

5. The apparatus of claim 2, wherein the handle has a range of motion from less than 90 degrees relative to the top surface of the build platform to 0 degrees resting in the cavity.

6. The apparatus of claim 1, wherein the build platform is vertically movable within the apparatus.

7. The apparatus of claim 1, wherein the opening comprises a mechanism to open a valve on the hose.

8. The apparatus of claim 1, wherein the opening comprises a magnet that provides feedback indicating that the supply hose is connected.

9. An apparatus, comprising:
a build platform for a 3D printer;
an enclosed build material storage below the build platform; and
an opening in a top surface of the build platform that provides access to the enclosed build material storage, wherein the opening comprises:
a hose valve opening mechanism coupled to a bottom ring for opening a valve on a supply hose that rests against the bottom ring.

10. The apparatus of claim 9, wherein the opening comprises a mating mechanism to mate with a cap.

11. The apparatus of claim 10, wherein the mating mechanism aligns the cap such that a handle on the cap falls down in a direction that a spreader moves.

12. The apparatus of claim 10, wherein a top surface of the cap and a top surface of the build platform have a uniform thermal conductivity.

13. The apparatus of claim 10, wherein the cap fills the opening.

14. The apparatus of claim 9, wherein the hose valve opening mechanism comprises a hook that protrudes perpendicular to a surface of the bottom ring.

15. The apparatus of claim 9, wherein the supply hose includes a sensor to indicate that the supply hose is correctly connected into the opening.

16. A method, comprising:
removing a cap from an opening in a top surface of a three dimensional (3D) build platform;
supplying build material into an enclosed build material storage below the 3D platform at a maximum rate without a pouring speed control via a supply hose inserted into the opening; and
replacing the cap into the opening in the top surface of the 3D build platform after the supplying the build material is completed and the supply hose is removed from the opening.

17. The method of claim 16, wherein a presence sensor is triggered in response to the supply hose being correctly inserted into the opening.

18. The method of claim 17, wherein the presence sensor is triggered by a magnet in the opening.

19. The method of claim 16, wherein the cap is removed via a handle that rests in a cavity in a top surface of the cap.

20. The method of claim 16, wherein the cap is replaced by aligning a mating mechanism on the cap with a corresponding mating mechanism in the opening.

* * * * *